United States Patent
Rahman (10) Patent No.: US 12,095,509 B2
(45) Date of Patent: Sep. 17, 2024

(54) ENABLING COMMUNICATION WITH A DRONE OVER A WIDE GEOGRAPHICAL AREA USING A WIRELESS TELECOMMUNICATION NETWORK

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 402 days.

(21) Appl. No.: 17/680,157

(22) Filed: Feb. 24, 2022

(65) Prior Publication Data
US 2023/0269000 A1    Aug. 24, 2023

(51) Int. Cl.
*H04B 10/50* (2013.01)
*H04B 10/40* (2013.01)
*H04B 17/318* (2015.01)

(52) U.S. Cl.
CPC ........... *H04B 10/503* (2013.01); *H04B 10/40* (2013.01); *H04B 17/318* (2015.01)

(58) Field of Classification Search
CPC ..... H04B 10/503; H04B 17/318; H04B 10/40
See application file for complete search history.

(56) References Cited

U.S. PATENT DOCUMENTS

| | | | |
|---|---|---|---|
| 5,661,582 A * | 8/1997 | Kintis | H04B 7/18515 398/115 |
| 6,816,682 B1 * | 11/2004 | Ionov | H04B 10/118 398/124 |
| 9,571,180 B2 | 2/2017 | Jalali et al. | |
| 9,715,009 B1 | 7/2017 | Parker et al. | |
| 9,818,303 B2 | 11/2017 | Kotecha | |
| 9,853,713 B2 | 12/2017 | Jalali | |
| 9,866,313 B1 | 1/2018 | Murphy | |
| 9,918,234 B2 | 3/2018 | Zerick et al. | |
| 9,918,235 B2 | 3/2018 | Brennan et al. | |

(Continued)

FOREIGN PATENT DOCUMENTS

| | | | |
|---|---|---|---|
| CN | 110391849 A | * 10/2019 | |
| CN | 111076707 A | 4/2020 | |

(Continued)

*Primary Examiner* — Pranesh K Barua
(74) *Attorney, Agent, or Firm* — Perkins Coie LLP (57) ABSTRACT

The disclosed system receives, from a controller associated with an unmanned vehicle, a first instruction to deliver to the unmanned vehicle. The first instruction is delivered to a network through a radio frequency channel associated with the network. The controller provides a coverage area in which the controller can directly communicate with the unmanned vehicle, however, the unmanned vehicle is outside of the coverage area associated with the controller. The system converts the first instruction received through the radio frequency channel to a second instruction encoded in a second medium. The system delivers the second instruction to the unmanned vehicle using a first antenna operating in the second medium. The unmanned vehicle includes a receiver configured to operate in the second medium. The first antenna is oriented to provide coverage in a geographical area in which the network does not provide radio frequency coverage.

20 Claims, 6 Drawing Sheets

(56) References Cited

U.S. PATENT DOCUMENTS

| | | | |
|---|---|---|---|
| 9,996,079 B2 | 6/2018 | Magy et al. | |
| 10,090,909 B2 | 10/2018 | Peitzer et al. | |
| 10,153,830 B2 | 12/2018 | Kosseifi et al. | |
| 10,225,746 B2 | 3/2019 | Mohammed et al. | |
| 10,292,055 B2 | 5/2019 | Carpenter et al. | |
| 10,431,103 B2 | 10/2019 | Murphy | |
| 11,050,481 B2 | 6/2021 | Crans et al. | |
| 2003/0078052 A1* | 4/2003 | Atias | H04B 10/1127 455/453 |
| 2004/0001720 A1* | 1/2004 | Krill | H04B 7/18508 398/121 |
| 2017/0214462 A1* | 7/2017 | Busche | H04B 7/18513 |
| 2018/0350243 A1 | 12/2018 | Priest | |
| 2018/0350245 A1 | 12/2018 | Priest | |
| 2019/0028197 A1* | 1/2019 | Turner | H04B 7/195 |
| 2019/0035285 A1 | 1/2019 | Priest | |
| 2019/0043368 A1 | 2/2019 | Priest | |
| 2019/0080619 A1 | 3/2019 | Priest | |
| 2019/0132050 A1* | 5/2019 | Salhab | H04B 10/1129 |
| 2019/0155312 A1 | 5/2019 | Tam | |
| 2020/0219407 A1 | 7/2020 | Priest | |
| 2020/0226938 A1 | 7/2020 | Priest | |
| 2020/0234600 A1 | 7/2020 | Priest | |
| 2020/0250998 A1 | 8/2020 | Priest | |
| 2020/0265727 A1 | 8/2020 | Priest | |
| 2020/0286390 A1 | 9/2020 | Priest | |
| 2020/0286393 A1 | 9/2020 | Priest | |
| 2021/0020055 A1 | 1/2021 | Bazawada et al. | |

FOREIGN PATENT DOCUMENTS

| | | |
|---|---|---|
| CN | 111290434 A | 6/2020 |
| CN | 210724786 U | 6/2020 |
| CN | 111694371 A | 9/2020 |
| CN | 107734604 B | 1/2021 |
| CN | 110312071 B | 2/2021 |
| CN | 112486195 A | 3/2021 |
| CN | 110942673 B | 6/2021 |
| DE | 102018101878 A1 | 8/2019 |
| EP | 3504673 A1 | 7/2019 |
| EP | 3507999 A1 | 7/2019 |
| EP | 3732920 A1 | 11/2020 |
| EP | 3777321 A1 | 2/2021 |
| EP | 3857998 A1 | 8/2021 |
| EP | 4329214 A1 * | 2/2024 |
| JP | 2020518886 A | 6/2020 |
| JP | 2021019343 A | 2/2021 |
| KR | 100324581 B1 | 2/2002 |
| KR | 100954500 B1 | 4/2010 |
| KR | 20130009891 A | 1/2013 |
| KR | 20180074325 A | 7/2018 |
| KR | 102088989 B1 | 4/2020 |
| WO | 2017193083 A1 | 11/2017 |
| WO | 2018125686 A2 | 7/2018 |
| WO | 2019133751 A1 | 7/2019 |
| WO | 2020082349 A1 | 4/2020 |
| WO | 2020113062 A1 | 6/2020 |
| WO | 2020172873 A1 | 9/2020 |
| WO | 2020220234 A1 | 11/2020 |
| WO | 2020221467 A1 | 11/2020 |
| WO | 2021031126 A1 | 2/2021 |
| WO | 2021031129 A1 | 2/2021 |

* cited by examiner

ENABLING COMMUNICATION WITH A DRONE OVER A WIDE GEOGRAPHICAL AREA USING A WIRELESS TELECOMMUNICATION NETWORK

BACKGROUND

An unmanned aerial vehicle (UAV), commonly known as a drone, is an aircraft without any human pilot, crew, or passengers on board. UAVs are one of the components of an unmanned aircraft system, which additionally include a ground-based controller and a system of communications with the UAV. The flight of UAVs may operate under remote control by a human operator. One of the drawbacks of current drone technology is that the drone is limited to remain within the coverage area of the remote control, which is small compared to the area that the drone can travel.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable communication with a drone over a wide geographical area using a wireless telecommunication network ("network"). The system can receive, from a controller (e.g. a mobile phone) associated with the drone, a first instruction to deliver to the drone. The system can deliver the first instruction to the network through a radio frequency channel associated with the network. The controller can provide a coverage area in which the controller can directly communicate with the drone, however, the drone can be outside of the coverage area associated with the controller. The system can convert the first instruction received through the radio frequency channel to a second instruction using a laser communications system.

Laser is an acronym for light amplification by stimulated emission of radiation. The laser communications system uses lasers to send laser signals between two communication endpoints. The laser signals can operate at a terahertz frequency. Laser light covers much wider range of the electromagnetic spectrum, anything between 150 nm up to 11000 nm (i.e., from the Ultra-Violet up to the far Infra-Red) wavelength. This corresponds to 1998 THz to 27 THz as frequency, f=Light speed(c)/wavelength($\lambda$) wherein c=3× $10^8$ m/s. A laser communications system provides wireless connections through the atmosphere. A laser communications system works similarly to fiber optic links, except the beam is transmitted through free space. While the transmitter and receiver must require line-of-sight conditions, they have the benefit of eliminating the need for broadcast rights and buried cables. Laser communications systems can be easily deployed since they are inexpensive, small, low power and do not require any radio interference studies. The carrier used for the transmission signal is typically generated by a laser diode. The system uses two parallel beams, one for transmission and one for reception.

The system can deliver the second instruction to the drone using a first laser antenna. The drone includes a laser receiver. The first laser antenna is oriented to provide coverage in a geographical area in which the wireless telecommunication network does not provide radio frequency coverage.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
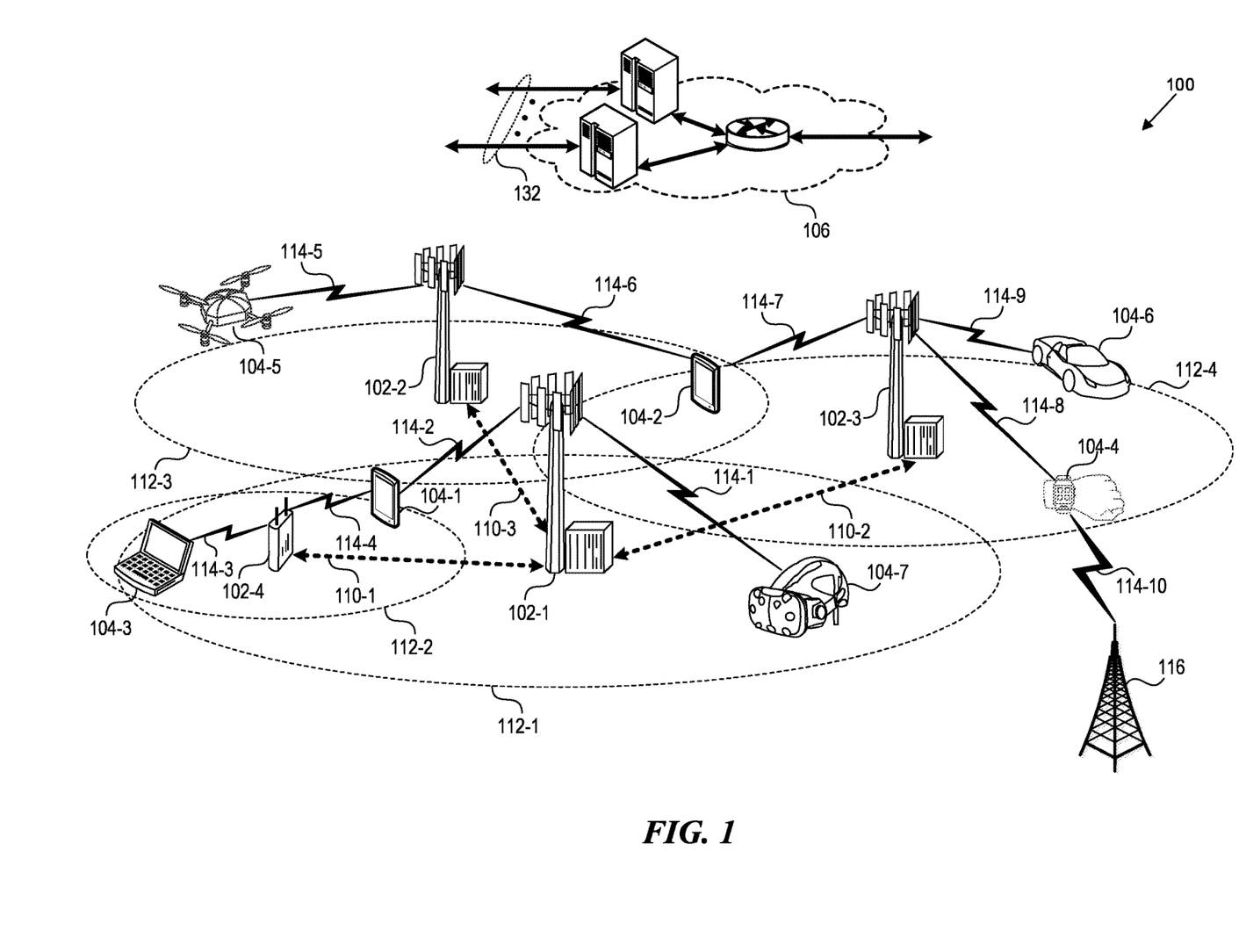
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographical coverage areas 112-1 through 112-4 (also referred to individually as "coverage area 112" or collectively as "coverage areas 112"). The geographical coverage area 112 for a base station 102 can be divided into sectors making up only a portion of the coverage area (not shown). The network 100 can include base stations of different types (e.g., macro and/or small cell base stations). In some implementations, there can be overlapping geographical coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographical area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographical area and can allow unrestricted access by wireless devices that have service subscriptions with the network 100 provider. A femto cell covers a relatively smaller geographical area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside of the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
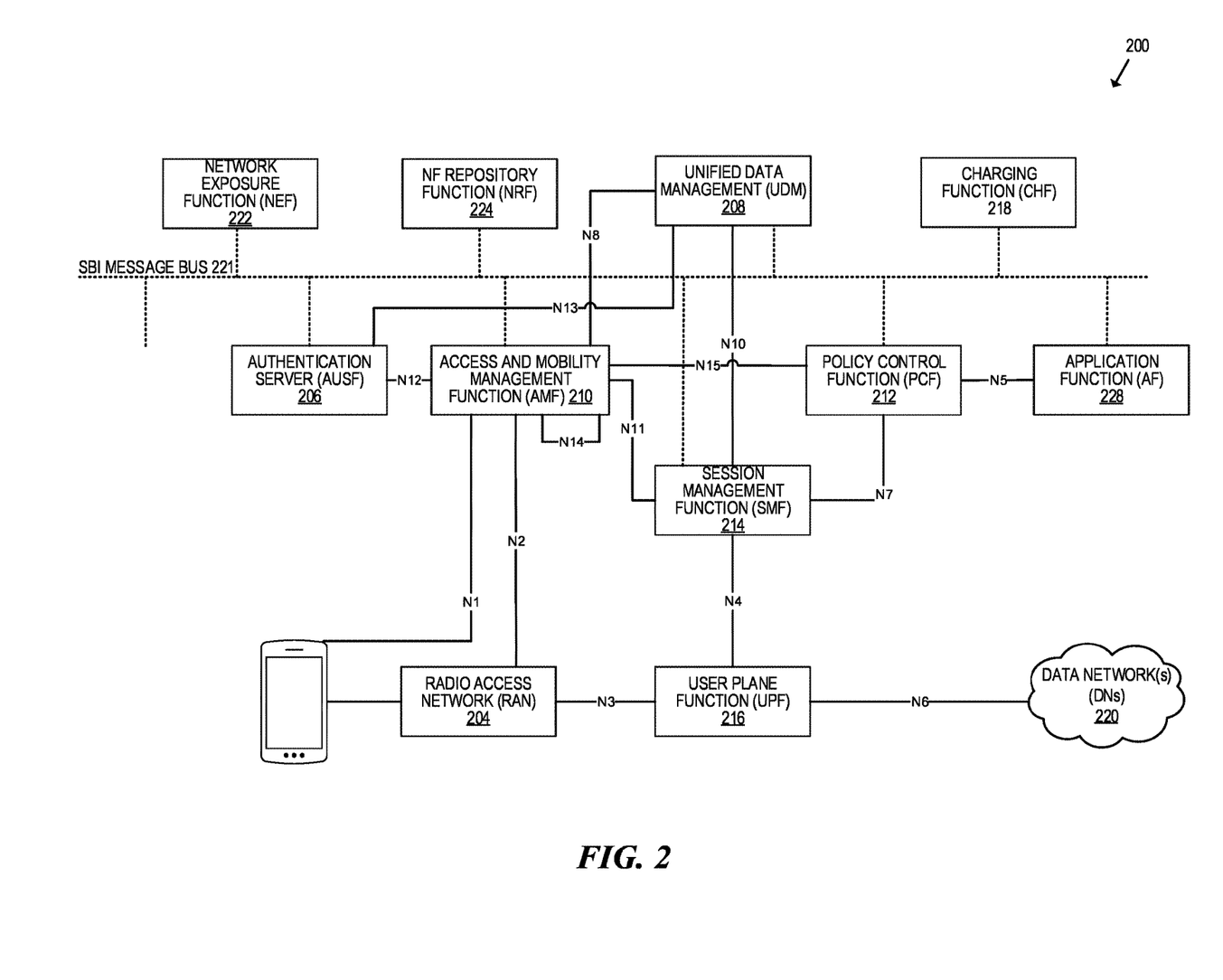
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Random Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QoS) and charging rules, includes network slice selection, which is regulated by the NSSF 226.

Figure 3:
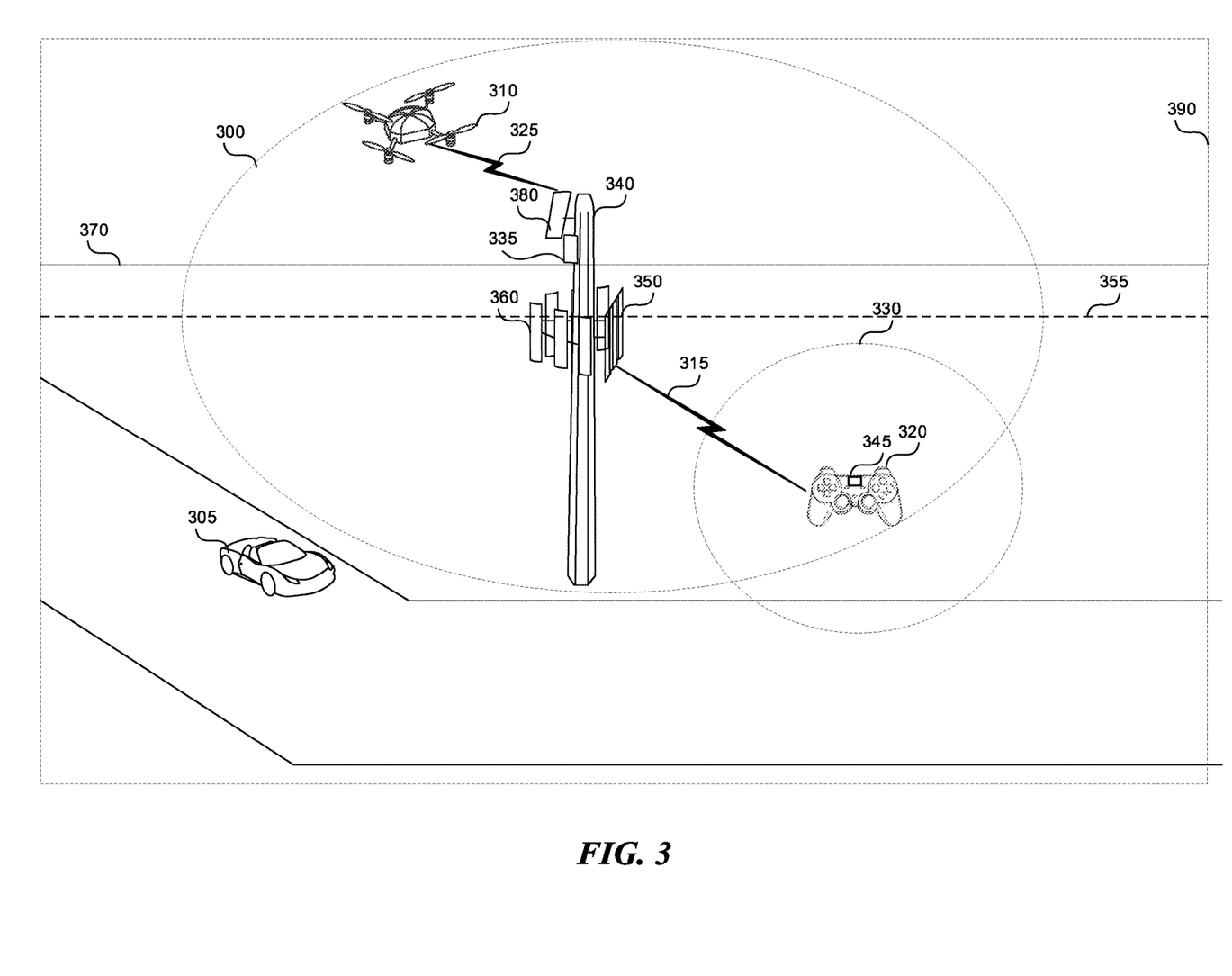
FIG. 3 shows a system to enable communication with a drone over a wide geographical area using the wireless telecommunication network.

Enabling Communication with a Drone Over a Wide Geographical Area Using a Wireless Telecommunication Network FIG. 3 shows a system 300 to enable communication with a drone 310 over a wide geographical area using the wireless telecommunication network. The drone 310 can be an unmanned vehicle such as an unmanned aerial vehicle, an unmanned terrestrial vehicle, or an unmanned marine vehicle. The drone 310 can be an autonomous vehicle, or can be remotely controlled via the remote control ("controller") 320. The controller 320 can be a mobile device, such as a cell phone, digital watch, or personal digital assistant, or a controller dedicated to communicating with the drone 310.

One of the drawbacks of current drone technology is that the drone 310 has to be operated by the ground handheld controller 320, which requires an exclusive Wi-Fi link with the drone. The Wi-Fi link operates within a limited physical distance defining an area 330. Consequently, the drone 310 cannot get out of the area 330 because outside of the area 330, the Wi-Fi connection with the controller 320 is lost.

A tower 340 can be part of the network 100 in FIG. 1, and can include radio frequency antennas 350, 360 (only two labeled for brevity) which can provide coverage, such as 4G or 5G coverage, to an area 370 close to the ground, where people use UEs 305 to live, communicate, and work. The area 370 provides coverage from the ground to 100-200 meters above the ground. The area 370 in which the network 100 provides coverage is considerably larger than the area 330 where the Wi-Fi link provides coverage, however the area 370 does not cover high-flying drones 310, which can fly above the area 370.

An antenna 380 can be installed on the tower 340, and can be pointed upwards, as shown in FIG. 3, thus creating coverage in the area 390, which can cover a region from 100 meters above the ground to 3 km above the ground. In addition to providing coverage in the vertical area, the antenna 380 can provide horizontal coverage coextensive with the coverage of the network 100. In other words, the area 390 in which the drone 310 can operate can have the same footprint as the coverage of the network 100.

The antenna 380 can be a radio frequency antenna. The antenna 380 can be an additional radio frequency antenna, so that radio frequency antennas 350, 360 do not have to point away from the ground to cover the area 390. If radio frequency antennas 350, 360 point away from the ground, the ground coverage of UEs 305 would suffer.

The antenna 380 can operate at a different frequency than the radio frequency antennas 350, 360. For example, the antenna 380 can be a satellite antenna operating in a satellite antenna frequency band. Satellite communications are conducted over a wide range of frequency bands. The typical bands considered for small satellites are UHF, S, X, and Ka. The most mature bands are VHF and UHF frequencies. The UHF radio frequency band includes 300 to 1000 MHz, the S frequency band includes 2 to 4 GHz, the X frequency band includes 8 to 12 GHz, and the Ka frequency band includes 27 to 40 GHz, while the VHF frequency band includes 30 to 300 MHz. The communication via satellite antenna can suffer from impairment due to weather and rain, as well as from latency due to the large distances that the signal needs to travel.

The antenna 380 can be a laser antenna or laser transmitter. The laser antenna 380 can be highly directional and need a line of sight between the antenna and the drone 310. Because the laser antenna is highly directional, the communication between the drone 310 and the laser antenna 380 can be hidden from other devices or people that are in the area but not in the line of sight between the laser antenna 380 and the drone 310. In addition, directionality of the laser beam reduces interference between multiple signals having the same frequency. Further, the use of the laser beam operates in a terahertz frequency range, and does not create interference with the radio frequencies of 4G and 5G cellular communications networks. Also, the terahertz frequency range does not create interference with frequencies traditionally used to communicate with the drones such as 900 MHz, 2.4 GHz, or 5.8 GHz. Finally, the terahertz frequency of the laser communication is much higher than the radio frequency used in the 4G and 5G networks, and consequently the laser communication is much more efficient than the radio frequency communication.

When the laser antenna 380 cannot reach the drone 310, a hybrid solution can be implemented by using a satellite antenna or by directing a radio frequency antenna 350, 360 to provide coverage to the drone 310.

Consequently, the communication between the remote control 320 and the drone 310 can occur in two distinct segments 315, 325. In the first segment 315, the remote control 320 can communicate with the radio frequency antennas 350, 360 using traditional radio frequency communication, such as 4G or 5G. So, communication segments 315 between the drone controller 320 and the drone 310 can hop via 4G/5G radio base stations, until the tower 340 is reached, which provides coverage given the current drone location. In the second segment 325, the communication can occur between the antenna 380 and the drone 310 using laser, satellite, or radio frequency communication.

The network 100 can include a converter 335 to convert the incoming radio frequency communication in the first segment 315 to a medium in which the antenna 380 is operating. For example, if the antenna 380 is a laser antenna, the converter can convert the radio frequency communication to a communication encoded using a laser communications system, and vice versa. In another example, when the antenna 380 is a satellite antenna, the converter can convert the radio frequency communication to a communication in a frequency band of the satellite antenna.

The controller 320 on the ground can have a SIM card 345, which can enable the controller to communicate with the network 100. Alternatively, the controller 320 can be in the Wi-Fi coverage of the home internet, through which the controller can communicate with the network 100. As a consequence of the ability to control the drone 310 over a wide geographical area, the drone can expand its current operating range, far beyond its traditional operating range in the area 330, to, for example, area 390. By expanding the area in which the drone 310 can operate, the drone can expand its use cases. For example, the drones operating in a wide geographical area 390 can deliver emergency supplies, provide communication infrastructure, and provide information in hard-to-access areas, such as in wildfire situations and/or adversarial situations.

The drone 310 can be used for delivery, for extending internet connectivity by extending cellular or internet coverage, for reconnaissance in hazardous situations, etc. The drone 310 can provide its geographical location to the network 100. Consequently, authorized devices such as the controller 320 can monitor the location of the drone 310, and progress towards a goal. Other authorized devices can include a device to which the delivery is being made, or other devices authorized to access the reconnaissance information. Prior to takeoff, the drone 310 can receive a list of authorized devices to which to send the geographical location of the drone. For example, if the authorized device includes a receiving device expecting the delivery, the drone 310 can indicate an estimated time of arrival to the receiving device, as well as the exact time when the delivery is being made.

During landing and takeoff, the drone 310 can traverse a vertical distance from approximately ground level to hundreds of meters above the ground. When the drone is above a predetermined altitude threshold 355 of, for example, 60 meters, the drone can communicate with the antenna 380. However, when the drone is below the predetermined altitude threshold, the drone may not be able to communicate with the antenna 380 because the drone may be out of reach of the antenna 380, or because of the safety concerns regarding the impact of the antenna frequencies on ground life.

During takeoff, the drone 310 can communicate with the controller 320 using Wi-Fi communication until the drone is out of range of the Wi-Fi communication. Before ascending beyond the predetermined altitude threshold 355, and while out of range of the Wi-Fi communication, the drone 310 can communicate with the radio frequency antennas 350, 360 of the network 100.

During landing, the drone 310 can communicate with the antenna 380, until descending beneath the predetermined altitude threshold 355. Once the drone 310 descends beneath the predetermined altitude threshold 355, the drone can communicate with the radio frequency antennas 350, 360 of the network 100. Once the drone 310 is in range of communication of the controller 320 or a receiving device, the drone can switch to communicating with the controller 320 and/or the receiving device directly.

Figure 4:
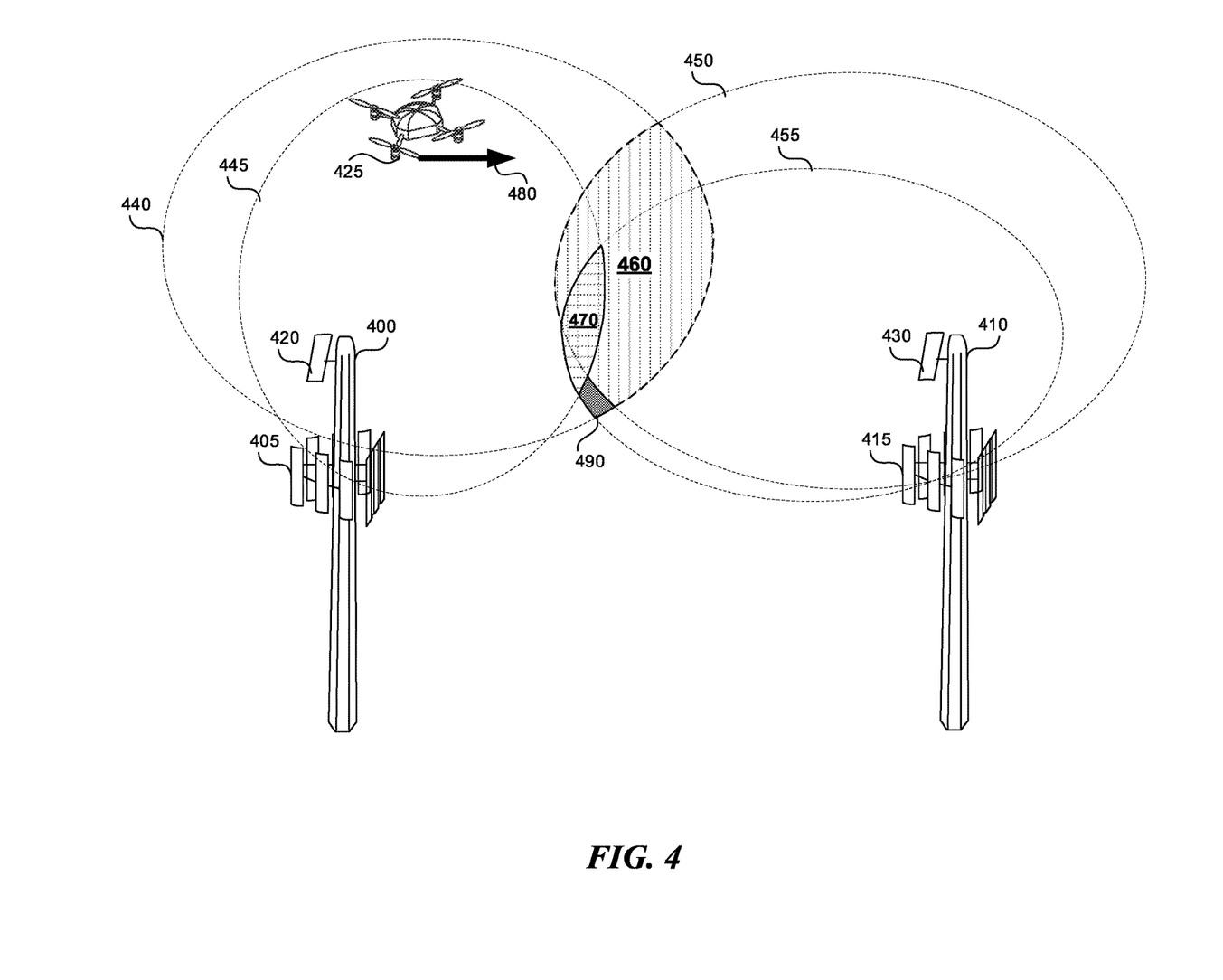
FIG. 4 shows a handoff at a boundary between two antennas.

FIG. 4 shows a handoff at a boundary between two antennas. The towers 400, 410 can be part of the network 100 in FIG. 1. In addition to the radio frequency antennas 405, 415 (only two labeled for brevity), the towers can also include a specialized antenna 420, 430 that is pointed toward the sky, and can provide coverage in a vertical area where the radio frequency antennas 405, 415 do not provide coverage, as described in this application. The specialized antenna 420, 430 can be a laser antenna.

In one embodiment, each antenna 420, 430 can have a transmission profile and a reception profile. The transmission profile indicates an area 440, 450 in which the antenna 420, 430 can provide coverage to the drone 425, respectively. The reception profile indicates an area 445, 455 in which the antenna 420, 430 can receive a communication from the drone 425, respectively. The transmission coverage areas 440, 450 and reception coverage areas 445, 455 associated with the same antenna 420, 430 can overlap, but may not be the same. Additionally, the transmission coverage areas 440, 450 associated with different antennas 420, 430 can overlap, so that in the area 460, both of the antennas 420, 430 can provide coverage to the drone 425. Similarly, the reception coverage areas 445, 455 associated with different antennas 420, 430 can overlap, so that both antennas 420, 430 can receive communications from the drone 425 in the area 470.

The network 100 can facilitate communication between antennas 420, 430 to create a seamless handoff for the drone 425 as the drone travels and exits the area 440 covered by the antenna 420, and enters the area 450 covered by the antenna 430. The network 100 can exchange the transmission profile and the reception profile between the antennas 420, 430. In addition, the network 100 can obtain the drone's velocity 480. Based on the transmission coverage areas 440, 450 and the drone's velocity 480, the network 100 can predict when the drone will enter the area 450, and can facilitate the handoff of the transmission between the antennas 420, 430.

Similarly, the antennas 420, 430 can exchange each other's reception coverage area 445, 455. Based on the drone's velocity 480, and the reception coverage area 445, 455, the network 100 can determine which antenna 420, 430 should receive a communication from the drone 425. Because the reception coverage area 445, 455 can be different from the transmission coverage area 440, 450, different antennas can be responsible for sending communication to the drone 425, and receiving communication from the drone. For example, when the drone is in the area 490, the antenna 420 can send communications to the drone 425, while the antenna 430 can receive communications from the drone.

In another embodiment, to perform the handoff, the drone 425 can measure the signal strength of the towers 400, 410. For example, the tower 400 can be the serving tower for the drone 425. As the drone 425 moves towards area 450, the signal from the tower 410 can intensify. When the strength of the signal from the tower 410 exceeds the strength of the signal from the tower 400 for a predetermined amount of time, such as 100 milliseconds, the drone 425 can send a request to the tower 400 to switch the serving tower to tower 410. In addition to sending the switch request, the drone 425 can send a unique identifier (ID) associated with the drone 425. The unique ID can be akin to International Mobile Equipment Identity (IMEI) for mobile phones, and unique to the drone 425 among all other drones. The tower 400 can send a message to the tower 410 instructing the tower to begin communicating with the drone 425 having the unique ID.

Figure 5:
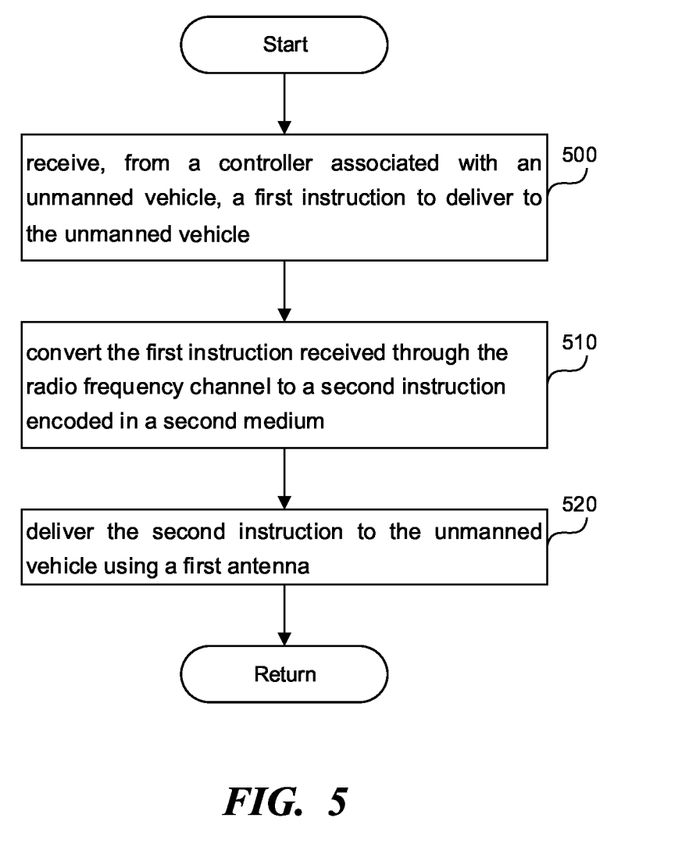
FIG. 5 is a flowchart of a method to enable communication with an unmanned vehicle over a wide geographical area using a wireless telecommunication network.

FIG. 5 is a flowchart of a method to enable communication with an unmanned vehicle over a wide geographical area using a wireless telecommunication network. A hardware or software processor executing instructions described in this application can, in step 500, receive, from a controller associated with an unmanned vehicle, a first instruction to deliver to the unmanned vehicle. The unmanned vehicle can include an unmanned aerial vehicle, an unmanned terrestrial vehicle, or an unmanned marine vehicle. The unmanned vehicle can be autonomous. The processor can deliver the first instruction to the wireless telecommunication network through a radio frequency channel associated with the wireless telecommunication network. The controller can provide a coverage area in which the controller can directly communicate with the unmanned vehicle, however, the unmanned vehicle can be outside of the coverage area associated with the controller.

In step 510, the processor can convert the first instruction received through the radio frequency channel to a second instruction encoded in a second medium. The second medium can include a different electromagnetic frequency such as a laser, or a satellite communication frequency.

In step 520, the processor can deliver the second instruction to the unmanned vehicle using a first antenna, configured to operate in the second medium. For example, the first antenna can be a laser antenna. The unmanned vehicle can include a receiver configured to operate in the second medium. The first antenna is oriented to provide coverage in a geographical area in which the wireless telecommunication network does not provide radio frequency coverage. For example, the first antenna can be oriented towards the sky, where an unmanned vehicle is likely to be.

The processor can smoothly handle a handoff between two different antennas configured to communicate with the unmanned vehicle in the second medium. To perform the handoff, the processor can obtain a first transmission profile associated with the first antenna. The first transmission profile can indicate a first geographical region covered by the first antenna. The processor can obtain a second transmission profile associated with the second antenna. The second transmission profile can indicate a second geographical region covered by the second antenna. Based on the first transmission profile, and the second transmission profile, the processor can determine a boundary between a first geographical region covered by the first antenna and a second geographical region covered by the second antenna. The processor can obtain a speed associated with the unmanned vehicle. Based on the speed, and the boundary between the first geographical region and the second geographical region, the processor can predict when the unmanned vehicle will cross the boundary. Based on the prediction, the processor can initiate a handoff between the first antenna and the second antenna prior to the unmanned vehicle crossing the boundary.

Similarly, the processor can smoothly handle the handoff between two different antennas configured to receive a communication from the unmanned vehicle. The processor can obtain a first reception profile associated with the first antenna. The first reception profile can indicate a first geographical region in which the first antenna can receive a first communication. The processor can obtain a second reception profile associated with the second antenna. The second reception profile can indicate a second geographical region in which the second antenna can receive a second communication. Based on the first reception profile, and the second reception profile, the processor can determine a boundary between the first geographical region and the second geographical region. The processor can obtain a speed associated with the unmanned vehicle. Based on the speed, and the boundary between the first geographical region and the second geographical region, the processor can predict when the unmanned vehicle will cross the boundary. Based on the prediction, the processor can initiate a handoff between the first antenna and the second antenna prior to the unmanned vehicle crossing the boundary.

The processor can cause the controller associated with the unmanned vehicle to communicate with the wireless telecommunication network via a subscriber identification module card. The processor can cause the controller associated with the unmanned vehicle to communicate with the wireless telecommunication network via a Wi-Fi protocol.

The antenna communicating with the unmanned vehicle can be a satellite antenna. The processor can convert the first instruction received through the radio frequency channel to a second instruction encoded in a satellite communication frequency band. The processor can deliver the second instruction to the unmanned vehicle using a satellite antenna. The unmanned vehicle can include a satellite frequency band receiver. The satellite antenna can be oriented to provide coverage in a geographical area in which the wireless telecommunication network does not provide radio frequency coverage.

The processor can facilitate the handoff between different cellular antennas and/or towers of the wireless communication network. The processor can be associated with the unmanned vehicle, or with the wireless telecommunication network. The processor can obtain a unique ID associated with the unmanned vehicle. The processor can obtain a first measurement of signal strength associated with a first antenna and a second measurement of signal strength associated with a second antenna, where the first antenna is communicating with the unmanned vehicle. The processor can determine that the second measurement indicates a higher signal strength than the first measurement. For example, the processor can obtain a predetermined threshold, and when the second measurement is higher than the first measurement by the predetermined threshold or more, the processor can determine that the second measurement indicates a higher signal strength of the first measurement. The predetermined threshold can include one or more decibel. The processor can determine a time duration during which the second measurement has the higher signal strength than the first measurement. The processor can determine whether the time duration is above a predetermined time threshold. The predetermined time threshold can be 100 milliseconds. Upon determining that the time duration is above the predetermined time threshold, the processor can send an instruction to the second antenna to commence communication with the unmanned vehicle identified by the unique ID.

The processor can switch between communicating with the first antenna and communicating with the telecommunication network based on the altitude of the unmanned vehicle. The processor can be associated with the unmanned vehicle or with the wireless telecommunication network. For example, the unmanned vehicle can have an altitude sensor which can indicate the unmanned vehicle's altitude. Alternatively, the wireless telecommunication network can triangulate the unmanned vehicle's position to determine the unmanned vehicle's altitude.

The processor can obtain an altitude associated with the unmanned vehicle. The processor can obtain an altitude threshold indicating a distance from the ground. The altitude threshold can be 60 meters. The processor can determine whether the altitude associated with the unmanned vehicle is below the altitude threshold. Upon determining that the altitude associated with the unmanned vehicle is below the altitude threshold, the processor can cease communicating with the unmanned vehicle using the first antenna. Subsequently, the processor can initiate communication with the unmanned vehicle using the wireless communication network or a Wi-Fi network.

Computer System

Figure 6:
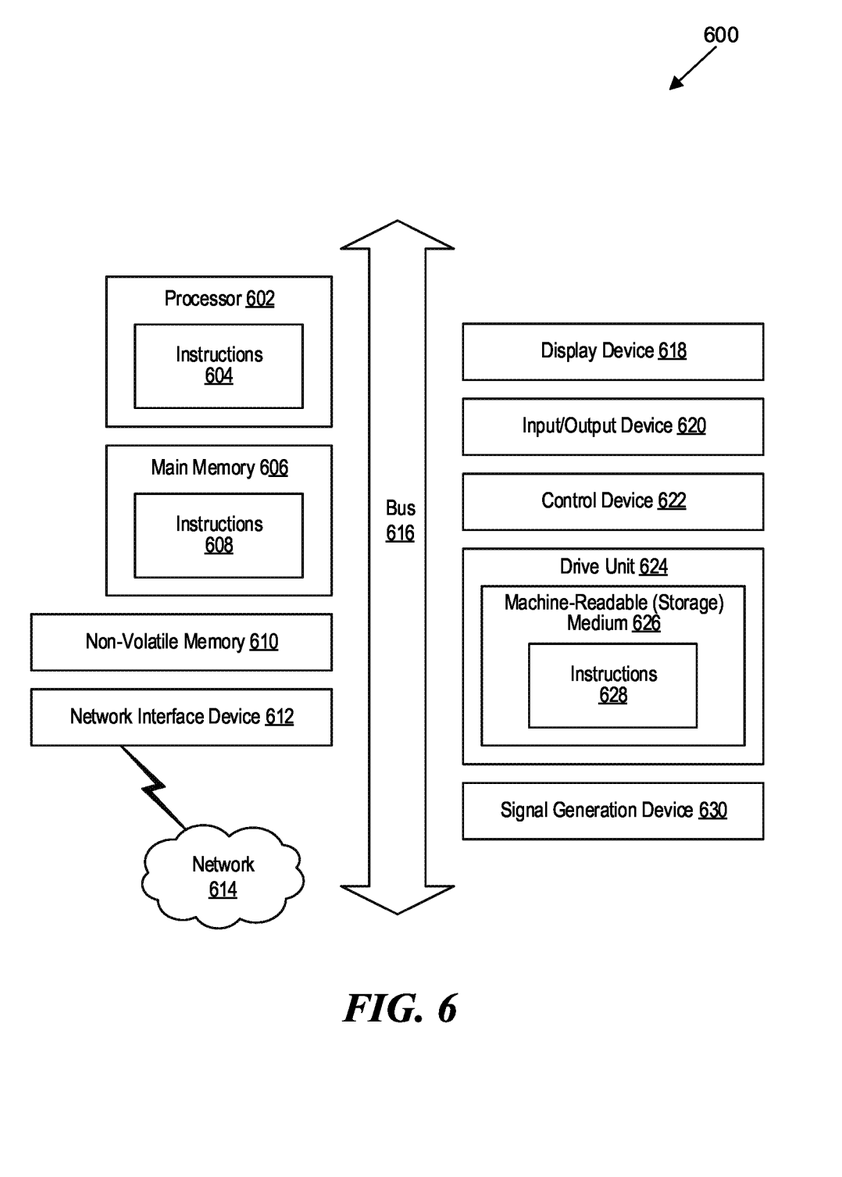
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one computer-readable storage medium, excluding transitory signals and carrying instructions to enable communication with a drone over a wide geographical area using a wireless cellular telecommunication network, which, when executed by at least one data processor of a system, cause the system to:
receive, from a mobile device associated with the drone, a first instruction to deliver to the drone,
wherein the first instruction is delivered to the wireless cellular telecommunication network through a radio frequency channel associated with the wireless cellular telecommunication network,
wherein the mobile device provides a coverage area in which the mobile device can directly communicate with the drone,
wherein the drone is outside of the coverage area associated with the mobile device;
convert the first instruction received through the radio frequency channel to a second instruction,
wherein the second instruction is configured to be transmitted using a laser communications system;
deliver the second instruction to the drone using a first laser antenna,
wherein the drone includes a laser receiver, and
wherein the first laser antenna is oriented to provide coverage in a geographical area in which the wireless cellular telecommunication network does not provide radio frequency coverage;
obtain a unique ID associated with the drone;
obtain a first measurement of signal strength associated with the first laser antenna and a second measurement of signal strength associated with a second laser antenna,
wherein the first laser antenna is communicating with the drone;
determine that the second measurement indicates a higher signal strength than the first measurement;
determine a time duration during which the second measurement indicated the higher signal strength than the first measurement;
determine whether the time duration is above a predetermined time threshold; and
upon determining that the time duration is above the predetermined time threshold, send an instruction to the second laser antenna to commence communication with the drone identified by the unique ID.

2. The computer-readable storage medium of claim 1, comprising instructions to:
obtain an altitude associated with the drone;
obtain an altitude threshold indicating a distance from the ground;
determine whether the altitude associated with the drone is below the altitude threshold;
upon determining that the altitude associated with the drone is below the altitude threshold, cease communicating with the drone using the first laser antenna; and
upon determining that the altitude associated with the drone is below the altitude threshold, initiate communication with the drone using the wireless cellular telecommunication network.

3. The computer-readable storage medium of claim 1, comprising instructions to:
obtain a first reception profile associated with the first laser antenna,
wherein the first reception profile indicates a first geographical region in which the first laser antenna can receive a first communication;
obtain a second reception profile associated with the second laser antenna,
wherein the second reception profile indicates a second geographical region in which the second laser antenna can receive a second communication;
based on the first reception profile and the second reception profile, determine a boundary between the first geographical region and the second geographical region;
obtain a speed associated with the drone;
based on the speed and the boundary between the first geographical region and the second geographical region, predict when the drone will cross the boundary; and
based on the prediction, initiate a handoff between the first laser antenna and the second laser antenna prior to the drone crossing the boundary.

4. The computer-readable storage medium of claim 1, including instructions to cause the mobile device associated with the drone to communicate with the wireless cellular telecommunication network via a subscriber identification module card.

5. The computer-readable storage medium of claim 1, including instructions to cause the mobile device associated with the drone to communicate with the wireless cellular telecommunication network via a Wi-Fi protocol.

6. The computer-readable storage medium of claim 1, comprising instructions to:
convert the first instruction received through the radio frequency channel to the second instruction encoded in a satellite communication frequency band; and
deliver the second instruction to the drone using a satellite antenna,
wherein the drone includes a satellite frequency band receiver, and
wherein the satellite antenna is oriented to provide coverage in the geographical area in which the wireless cellular telecommunication network does not provide radio frequency coverage.

7. A system comprising:
at least one hardware processor; and
at least one non-transitory memory storing instructions, which, when executed by the at least one hardware processor, cause the system to:
receive, from a controller associated with an unmanned vehicle, a first instruction to deliver to the unmanned vehicle,
wherein the first instruction is delivered to a wireless telecommunication network through a radio frequency channel associated with the wireless telecommunication network, wherein the controller provides a coverage area in which the controller can directly communicate with the unmanned vehicle,
wherein the unmanned vehicle is outside of the coverage area associated with the controller;
convert the first instruction received through the radio frequency channel to a second instruction,
wherein the second instruction is configured to be transmitted in a second medium different from the radio frequency channel; and
deliver the second instruction to the unmanned vehicle using a first antenna,
wherein the first antenna is configured to operate in the second medium,
wherein the unmanned vehicle includes a receiver configured to operate in the second medium, and
wherein the first antenna is oriented to provide coverage in a geographical area in which the wireless telecommunication network does not provide radio frequency coverage.

8. The system of claim 7, comprising instructions to:
obtain a unique ID associated with the unmanned vehicle;
obtain a first measurement of signal strength associated with the first antenna and a second measurement of signal strength associated with a second antenna, wherein the first antenna is communicating with the unmanned vehicle;
determine that the second measurement indicates a higher signal strength than the first measurement;
determine a time duration during which the second measurement indicated the higher signal strength than the first measurement;
determine whether the time duration is above a predetermined time threshold; and
upon determining that the time duration is above the predetermined time threshold, send an instruction to the second antenna to commence communication with the unmanned vehicle identified by the unique ID.

9. The system of claim 7, comprising instructions to:
obtain an altitude associated with the unmanned vehicle;
obtain an altitude threshold indicating a distance from the ground;
determine whether the altitude associated with the unmanned vehicle is below the altitude threshold;
upon determining that the altitude associated with the unmanned vehicle is below the altitude threshold, cease communicating with the unmanned vehicle using the first antenna; and
upon determining that the altitude associated with the unmanned vehicle is below the altitude threshold, initiate communication with the unmanned vehicle using the wireless telecommunication network.

10. The system of claim 7, comprising instructions to:
obtain a first transmission profile associated with a first laser,
wherein the first transmission profile indicates a first geographical region in which the first laser can send a first communication;
obtain a second transmission profile associated with a second laser,
wherein the second transmission profile indicates a second geographical region in which the second laser can send a second communication;
based on the first transmission profile and the second transmission profile, determine a boundary between the first geographical region and the second geographical region;
obtain a speed associated with the unmanned vehicle;
based on the speed and the boundary between the first geographical region and the second geographical region, predict when the unmanned vehicle will cross the boundary; and
based on the prediction, initiate a handoff between the first laser and the second laser prior to the unmanned vehicle crossing the boundary.

11. The system of claim 7, including instructions to cause the controller associated with the unmanned vehicle to communicate with the wireless telecommunication network via a subscriber identification module card.

12. The system of claim 7, including instructions to cause the controller associated with the unmanned vehicle to communicate with the wireless telecommunication network via a Wi-Fi protocol.

13. The system of claim 7, comprising instructions to:
convert the first instruction received through the radio frequency channel to the second instruction encoded in a satellite communication frequency band; and
deliver the second instruction to the unmanned vehicle using a satellite antenna,
wherein the unmanned vehicle includes a satellite frequency band receiver, and
wherein the satellite antenna is oriented to provide coverage in the geographical area in which the wireless telecommunication network does not provide radio frequency coverage.

14. The system of claim 7, wherein the unmanned vehicle includes an unmanned aerial vehicle, an unmanned terrestrial vehicle, or an unmanned marine vehicle.

15. The system of claim 7, wherein the first antenna includes a laser transmitter, a satellite antenna, or a radio frequency antenna.

16. A system comprising:
a wireless telecommunication network including multiple radio frequency antennas configured to provide cellular coverage to UEs associated with the wireless telecommunication network,
wherein the multiple radio frequency antennas are mounted on multiple towers associated with the wireless telecommunication network,
wherein the multiple radio frequency antennas are configured to provide coverage in a predetermined region,
wherein a radio frequency antenna among the multiple radio frequency antennas is configured to communicate with a controller associated with an unmanned vehicle;
a converter configured to convert a communication received from the controller associated with the unmanned vehicle to a laser-encoded communication; and
a first transmitter mounted on a tower among the multiple towers,
wherein the first transmitter is configured to provide coverage outside of the predetermined region, and
wherein the first transmitter is configured to deliver a laser encoded communication to the unmanned vehicle, when the unmanned vehicle is outside of the predetermined region.

17. The system of claim 16, the controller associated with the unmanned vehicle including a subscriber identification module card configured to communicate with the wireless telecommunication network.

18. The system of claim 16, the unmanned vehicle including an unmanned aerial vehicle, an unmanned marine vehicle, or an unmanned terrestrial vehicle.

19. The system of claim 16, the unmanned vehicle configured to:
- obtain a first measurement of signal strength associated with the first transmitter and a second measurement of signal strength associated with a second transmitter, wherein the first antenna is communicating with the unmanned vehicle;
- determine that the second measurement indicates a higher signal strength than the first measurement;
- determine a time duration during which the second measurement indicated the higher signal strength than the first measurement;
- determine whether the time duration is above a predetermined time threshold; and
- upon determining that the time duration is above the predetermined time threshold, send a request to commence communication with the second transmitter.

20. The system of claim 16, the unmanned vehicle configured to:
- obtain an altitude associated with the unmanned vehicle;
- obtain an altitude threshold indicating a distance from the ground;
- determine whether the altitude associated with the unmanned vehicle is below the altitude threshold;
- upon determining that the altitude associated with the unmanned vehicle is below the altitude threshold, cease communicating with the unmanned vehicle using the first transmitter; and
- upon determining that the altitude associated with the unmanned vehicle is below the altitude threshold, initiate communication with the unmanned vehicle using the wireless telecommunication network.

* * * * *